United States Patent
Kim et al.

(10) Patent No.: US 7,529,665 B2
(45) Date of Patent: May 5, 2009

(54) TWO STAGE UTTERANCE VERIFICATION DEVICE AND METHOD THEREOF IN SPEECH RECOGNITION SYSTEM

(75) Inventors: Sanghun Kim, Taejon (KR); YoungJik Lee, Taejon (KR)

(73) Assignee: Electronics and Telecommunications Research Institute, Taejeon (KR)

( * ) Notice: Subject to any disclaimer, the term of this patent is extended or adjusted under 35 U.S.C. 154(b) by 707 days.

(21) Appl. No.: 11/095,555

(22) Filed: Apr. 1, 2005

(65) Prior Publication Data

US 2006/0136207 A1  Jun. 22, 2006

(30) Foreign Application Priority Data

Dec. 21, 2004  (KR) .................... 10-2004-0109126

(51) Int. Cl.
*G10L 15/00* (2006.01)
*G10L 15/26* (2006.01)

(52) U.S. Cl. ...................... 704/236; 704/231

(58) Field of Classification Search ................. 704/236
See application file for complete search history.

(56) References Cited

U.S. PATENT DOCUMENTS 6,219,640 B1  4/2001 Basu et al.
6,292,778 B1  9/2001 Sukkar
2006/0122834 A1*  6/2006 Bennett ...................... 704/256

FOREIGN PATENT DOCUMENTS

KR  1020000025827  5/2000
KR  1020030001667  1/2003

OTHER PUBLICATIONS

Mazin G. Rahim, et al.; "Discriminative Utterance Verification for Connected Digits Recognition"; IEEE Transactions on Speech and Audio Processing, vol. 5, No. 3; May 1997.

* cited by examiner

*Primary Examiner*—David R Hudspeth
*Assistant Examiner*—Justin W Rider
(74) *Attorney, Agent, or Firm*—Lowe Hauptman Ham & Berner, LLP

(57) ABSTRACT

A two stage utterance verification device and a method thereof are provided. The two stage utterance verification method includes performing a first utterance verification function based on a SVM pattern classification method by using feature data inputted from a search block of a speech recognizer and performing a second utterance verification function based on a CART pattern classification method by using heterogeneity feature data including meta data extracted from a preprocessing module, intermediate results from function blocks of the speech recognizer and the result of the first utterance verification function. Therefore, the two state utterance verification device and the method thereof provide a high quality speech recognition service to a user.

6 Claims, 3 Drawing Sheets

TWO STAGE UTTERANCE VERIFICATION DEVICE AND METHOD THEREOF IN SPEECH RECOGNITION SYSTEM

BACKGROUND OF THE INVENTION

1. Field of the Invention

The present invention relates to a two stage utterance verification device and a method thereof in a speech recognition system, and more particularly, to a two stage utterance verification device in a speech recognition system for improving reliability of utterance verification by performing two stages of utterance verifications where a first stage of utterance verification is performed based on a support vector machine (SVM) pattern classification method by using data outputted from a search unit of a speech recognizer and a second stage of utterance verification is performed based on a classification and regression tree (CART) pattern classification method by using data outputted from functional blocks of speech recognizer, and a method thereof.

2. Description of the Related Art

Speech recognition has been utilized for controlling a terminal or an electric home appliance or for accessing target information. Recently, the speech recognition has been further implemented to an intelligent robot, a telematics and a home network. A speech recognition system should recognize 100% of speech uttered from a user. However, some of vocabularies are misrecognized by various factors such as noises, mistakes of a user and uttering of vocabularies which are not a target of recognition (OoV: out of vocabulary (OoV).

If a speech is misrecognized by the speech recognition system and the misrecognized result is transferred to the user as a system response, the user may have difficulty to use the speech recognition system. That is, it degrades usability of the speech recognition system. Therefore, a rejection function has been introduced. The rejection function performs an utterance verification method for verifying the speech recognition result. If the rejection function determines that the speech recognition result is confident, the rejection function transfers the result of speech recognition to the user as the system response. In contrary, if the rejection function determines that the speech recognition result is not confident, the rejection function requires the user to utter corresponding speech again.

As mentioned above, the utterance verification method analyzes a reliability of the speech recognition result by determining a possibility of misrecognizing corresponding speech and a possibility of correctly recognizing corresponding speech. According to the analyzing result, the utterance verification method decides the rejection of the speech recognition result. The utterance verification method can incredibly increase the usability of the speech recognition system even in a vehicle environment or a home environment. Therefore, the utterance verification method has been a necessary function of the speech recognition system.

A conventional speech recognition system uses a support vector machine (SVW) pattern classification method as the utterance verification method. The SVM pattern classification method determines misrecognition of the speech based on feature data such as an anti-model log likelihood ratio (LLR) score, N-best LLR score, combination of LLR score and word duration which are outputted from a search unit of a hidden markov model (HMM) speech recognizer.

Because the SVM pattern classification method of the conventional speech recognition system mainly uses intermediate results outputted in a recognition candidate searching step, the reliability of utterance verification is degraded and the conventional speech recognition system cannot provide satisfactory speech recognition service to the user.

SUMMARY OF THE INVENTION

Accordingly, the present invention is directed to two stage utterance verification device and a method thereof, which substantially obviates one or more problems due to limitations and disadvantages of the related art.

It is an object of the present invention to provide a two stage utterance verification device in a speech recognition system for improving reliability of utterance verification and providing high quality speech recognition service to a user by re-verifying a speech recognition result based on a classification and regression tree (CART) pattern classification method by using intermediate results and meta data such as a SNR, a gender, an age, the number of syllables, a phonetic structure, a pitch, a utterance duration, and a dialect which are outputted from speech recognition step, and a method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided al. A method for two stage utterance verification method, including the steps of: a) performing a first utterance verification function based on feature data inputted from a search block of a speech recognizer by using a support vector machine (SVM) pattern classification method; b) determining whether a confidence score, which is a result value of the first utterance verification function, is a misrecognition level for deciding rejection of a speech recognition result; c) performing a second utterance verification function based on a classification and regression tree (CART) pattern classification method by using heterogeneity feature data including meta data extracted from a pre-processing module, intermediate results from function blocks of the speech recognizer and the result of the first utterance verification function when the speech recognition result is accepted by the first utterance verification function, and returning when the speech recognition result is rejected by the first utterance verification function; and d) determining whether the speech recognition result is misrecognition based on a result of the second utterance verification function, transferring the speech recognition result to a system response module when the speech recognition result is accepted by the second utterance verification, and returning when the speech recognition result is rejected by the second utterance verification.

In another aspect of the present invention, there is provided a two stage utterance verification device in a speech recognition system, the device including: a speech input/output unit for inputting/outputting speech; a preprocessing module for receiving the speech from the speech input/output unit and extracting meta data from the received speech; a speech recognizer for performing speech recognition after receiving the meta data from the preprocessing module; and a utterance verification unit for performing a first utterance verification function based on feature data inputted from a search block of the speech recognizer by using a support vector machine (SVM) pattern classification method, performing a second utterance verification function based on a classification and regression three (CART) pattern classification method by using heterogeneity feature data including the meta data extracted from the preprocessing module, intermediate result values from functional blocks of the speech recognizer and the result of the first utterance verification when a confidence score, which is a result of the first utterance verification function, is accepted as a correct recognition, and transferring the speech recognition result to a system response module when a result of the second utterance verification function is accepted as the correct recognition.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
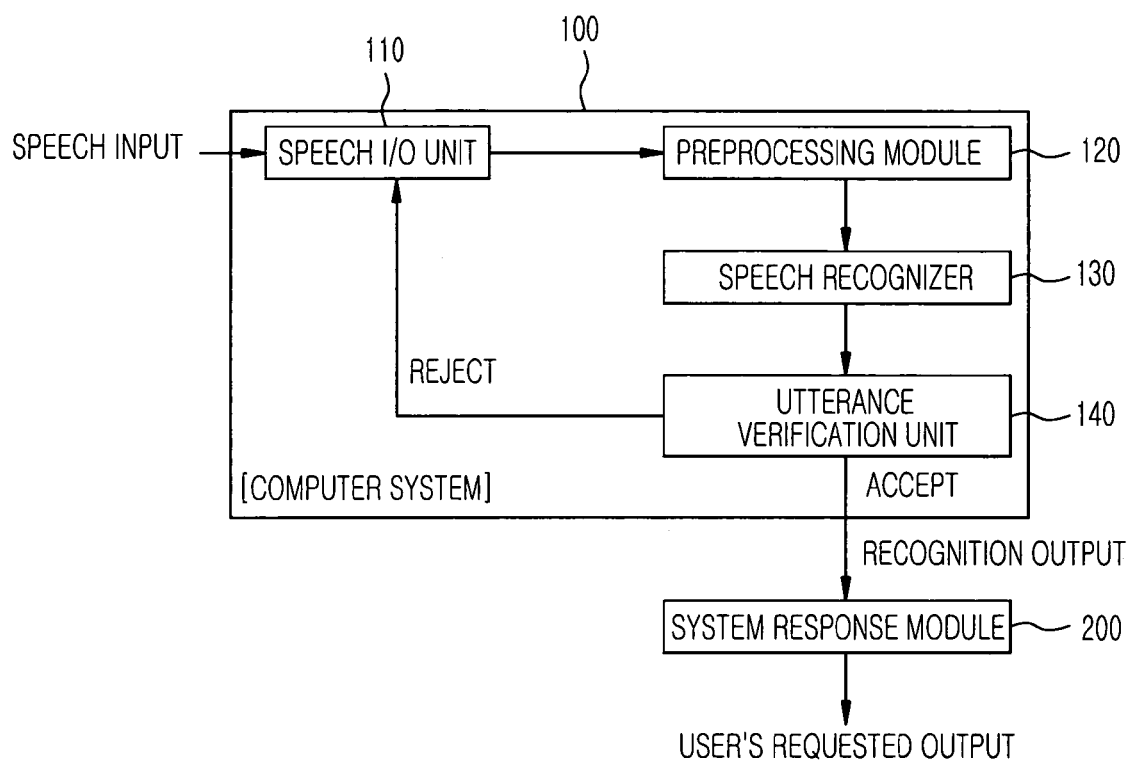
FIG. 1 is a block diagram illustrating a two stage utterance verification device of a speech recognition system in accordance with a preferred embodiment of the present invention.

FIG. 1 is a block diagram illustrating a two stage utterance verification device of a speech recognition system in accordance with a preferred embodiment of the present invention. The two stage utterance verification device includes a computer system 100 having a speech input/output (I/O) unit 110 for receiving and outputting a speech, a preprocessing module 120 for extracting feature data from a received speech, a speech recognizer 130 for performing a speech recognition, and a utterance verification unit 140 for determining a misrecognition of the speech recognition.

The utterance verification unit 140 performs a first utterance verification function based on a support vector machine (SVM) pattern classification method by using feature data inputted from a search block of the speech recognizer 130. If a confidence score, which is a result of speech recognition, is accepted by the first stage utterance verification, the utterance verification unit 140 performs a second utterance verification function. The second utterance verification function is performed based on a classification and regression tree (CART) pattern classification method by using heterogeneity feature data such as various meta data extracted by the preprocessing module 120, intermediate results of each blocks of the speech recognizer 130 and the result of the first utterance verification function. If the speech recognition result is accepted by the second utterance verification function, the utterance verification unit 140 transfers the result of the second utterance verification to a system response module 200.

Hereinafter, a two stage utterance verification method of the present invention is explained by referring to FIGS. 2 and 3.

Figure 2:
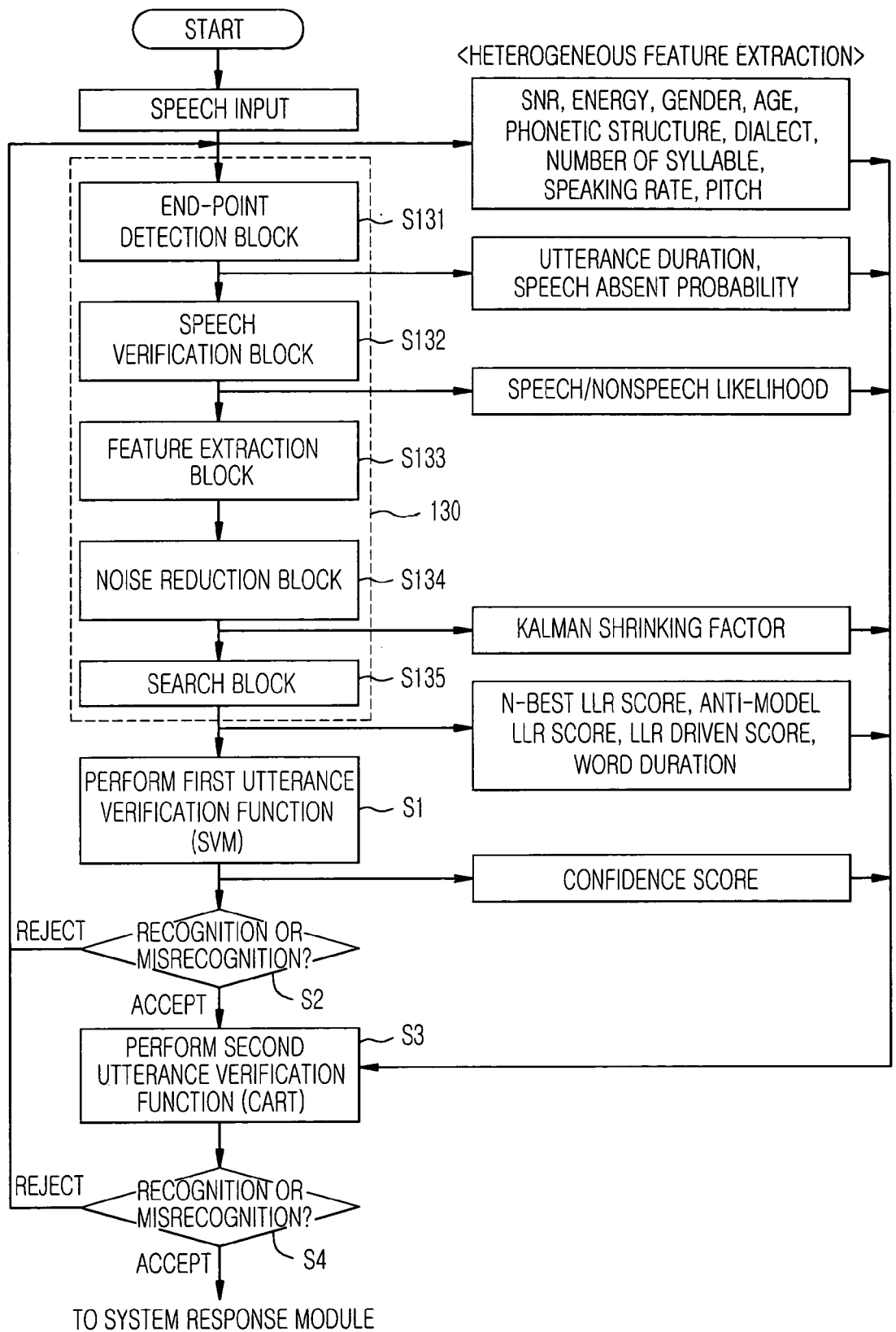
FIG. 2 is a flowchart of a two stage utterance verification method of a speech recognition system in accordance with a preferred embodiment of the present invention.

FIG. 2 is a flowchart of a two stage utterance verification method of a speech recognition system in accordance with a preferred embodiment of the present invention.

As shown in FIG. 2, the utterance verification unit 140 performs a first utterance verification function based on a support vector machine (SVM) pattern classification method by using feature data inputted from a search block 135 of the speech recognizer 130 at step S1. The feature data includes an anti-model log likelihood ratio (LLR) score, an N-best LLR score, a combination of LLR score and a word duration. The utterance verification unit 140 uses the SVM pattern classification method is used for determining misrecognition by using the feature data.

After performing the first utterance verification function, the utterance verification unit 140 determines a rejection of the speech recognition result based on a confidence score which is a result of the first utterance verification. If the confidence score is a misrecognition level, the speech recognition result is rejected and the two stage utterance verification device requests the user to utter corresponding speech again at step S2. A predetermined threshold value may be used for determining rejection of the speech recognition in the steps S1 and S2. That is, the first utterance verification function sets a predetermined threshold value guaranteeing the speech recognition result. If the confidence score is higher than the predetermined threshold value, it determines the speech recognition as misrecognition and the speech recognition result is rejected. If not, the speech recognition result is accepted and the second utterance verification function is performed.

If the confidence score of the first utterance verification is accepted as a correct speech recognition, the utterance verification unit 140 performs the second utterance verification function at step S3. The second utterance verification function is performed based on a classification and regression tree (CART) pattern classification method by using heterogeneity feature data including meta data extracted by the preprocessor module 120, intermediate results from function blocks of the speech recognizer 130 and the confidence score which is a result of the first utterance verification.

The function blocks of the speech recognizer 130 includes an End-point detection block 131, a speech verification block 132, a feature extraction block 133, a noise reduction block 134 and a search block 135 as shown in FIG. 2. A set of heterogeneity feature data is shown in following table.

TABLE 1

| NO. | name of feature data | description | type | remark |
|---|---|---|---|---|
| 1 | SNR | comparative level between speech and noise | integer | |
| 2 | Energy | amplitude of speech | integer | |
| 3 | Gender | gender of speaker | text | |
| 4 | Age | age of speaker | integer | |
| 5 | Phonetic structure | Phonetic structure of recognized word | text | three categories (high, intermediate, low) |
| 6 | Dialect | propensity of speaker | text | |
| 7 | Number of syllable in word | the number of syllables in a word | integer | |

TABLE 1-continued

| NO. | name of feature data | description | type | remark |
|---|---|---|---|---|
| 8 | Number of phoneme in word | the number of phonemes in a word | integer | |
| 9 | Number of frame in word | the number of frames in a word | integer | |
| 10 | Speaking rate | speed of speaking | integer | |
| 11 | Average pitch | average pitch | integer | |
| 12 | Utterance duration | duration of utterance | integer | |
| 13 | Speech absent probability | probability of speech absent | integer | |
| 14 | Speech/Nonspeech likelihood | ratio between speech and non-speech | float | |
| 15 | Kalman shrinking factor | Kalman updating factor | float | |
| 16 | Wiener forgetting factor | Wiener updating factor | float | |
| 17 | N-best LLR score | | float | |
| 18 | Anti-model LLR score | | float | |
| 19 | Filter bank SNR | NSR of each filter bank | integer | |
| 20 | LLR driven score | combination of LLR value | float | |
| 21 | SVM confidence score | result of first utterance verification function | float | |
| 22 | Beam width | size of beam during searching | integer | |
| 23 | Speed time | time for searching | float | |
| 24 | EPD time | time for searching end-point | float | |
| 25 | Time | time for using system | text | |
| 26 | Domain | category where a word used | text | name of person, name of place |

After performing the second utterance verification function, if the second utterance verification function rejects the speech recognition result by determining a result of the second utterance verification function as misrecognition, the user is required to utter the corresponding speech again. If the second utterance verification function accepts the speech recognition result, the speech recognition result is transferred to the system response module 200 at step S4.

The CART implemented to the second utterance verification function is one of statistical pattern classification methods and it is an algorithm increasing performance of pattern classification of the heterogeneity feature data as shown in Table 1. The CART requires a supervised training step for pattern classification. Also, the supervised training requires building a database with correct recognition results and misrecognition results as shown in Table 1. Also, a classification tree generated based on the supervised training. The CART performs the pattern classification by finding a classification standard that minimizes entropies of a pattern set after performing pattern classification for various heterogeneity feature data in the CART supervised training.

Figure 3:
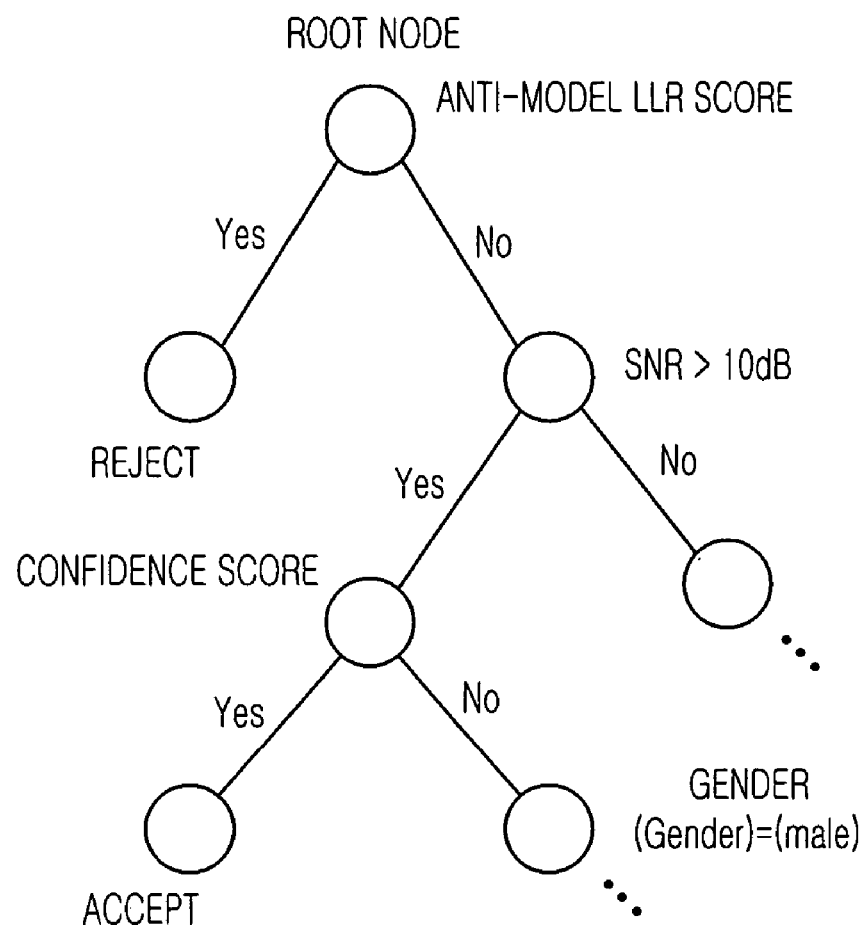
FIG. 3 is a conceptual view for explaining a CART pattern classification of the two stage utterance verification method in FIG. 2.

For classifying patterns, a binary decision tree as shown in FIG. 3 is generated according to the classification standard. The classification standard may be "how much is the anti-model LLR score?", "is SNR larger than a predetermined dB?", "is it man? Or woman?" or "how much is the confidence score?".

As shown in FIG. 3, classification standards of nodes of the binary tree are implemented to classify the speech recognition result. If the speech recognition result is not accepted by the classification standards of the nodes, the speech recognition result is classified to left path. If not, the speech recognition result is classified to a right path. For example, the speech recognition result is classified according to a classification standard of a root node which is "is anti-model LLR score is larger than −21" as shown in FIG. 3. If the classification standard of the root node is not accepted, the speech recognition result is classified to a left leaf node representing rejection and it is rejected accordingly. If the classification standard of the root node is accepted, the recognition result is classified to a right path of the root node and a classification standard of a right leaf node is implemented to further classify the speech recognition result. As mentioned above, a classification standard of each heterogeneity feature data is determined by orderly implementing a classification standard reducing larger amount of entropy to higher node of the binary decision tree. Based on the determined classification standard, a rule for automatically determining whether the speech recognition result is misrecognition or correct recognition may be produced.

The above mentioned two stage utterance verification method can be implemented as a set of computer executable instructions and the set of computer executable instructions can be stored in a computer recording medium such as a hard-disk, an optical disk, a CD-ROM, a flash memory, a ROM and a RAM.

The two stage utterance verification device and the method thereof increases reliability of utterance verification by performing the second utterance verification function after performing the first utterance verification function. The second utterance verification function performs the CART pattern classification method by using the heterogeneity feature data including the intermediate results outputted from the speech recognition step and the meta data such as SNR, gender, age, the number of syllables, phonetic structure, pitch, utterance speed and dialect. Therefore, the two state utterance verification device and the method thereof provide a high quality speech recognition service to a user.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for two stage utterance verification method, comprising the steps of:
    a) performing a first utterance verification function based on a support vector machine (SVM) pattern classification method by using feature data inputted from a search block of a speech recognizer;
    b) determining whether a confidence score, which is a result value of the first utterance verification function, is a misrecognition level for deciding rejection of a speech recognition result;
    c) performing a second utterance verification function based on a classification and regression tree (CART) pattern classification method by using heterogeneity feature data including meta data extracted from a pre-processing module, intermediate results from function blocks of the speech recognizer and the result of the first utterance verification function when the speech recognition result is accepted by the first utterance verification function, and returning when the speech recognition result is rejected by the first utterance verification function; and d) determining whether the speech recognition result is misrecognition based on a result of the second utterance verification function, transferring the speech recognition result to a system response module when the speech recognition result is accepted by the second utterance verification, and returning when the speech recognition result is rejected by the second utterance verification.

2. The method of claim 1, wherein the heterogeneity feature data of the step c) includes a SNR, an energy, a gender, an age, a phonetic structure, a dialect, the number of syllables in a word, the number of phonemes in a word, the number of frames in a word, a speaking rate, an average pitch, an utterance duration, a speech absent probability, a speech/non-speech likelihood, a Kalman shrinking factor, a Wiener shrinking factor, a N-best LLR score, an anti-model LLR score, a filter bank SNR, a LLR driven score, a SVM confidence score, a beam width during searching, a search time, a EPD time, a time for using system and a domain.

3. A two stage utterance verification device in a speech recognition system, the device comprising:
   a speech input/output unit for inputting/outputting speech;
   a preprocessing module for receiving the speech from the speech input/output unit and extracting meta data from the received speech;
   a speech recognizer for performing speech recognition after receiving the meta data from the preprocessing module; and
   a utterance verification unit for performing a first utterance verification function based on feature data inputted from a search block of the speech recognizer by using a support vector machine (SVM) pattern classification method, performing a second utterance verification function based on a classification and regression tree (CART) pattern classification method by using heterogeneity feature data including the meta data extracted from the preprocessing module, intermediate result values from functional blocks of the speech recognizer and the result of the first utterance verification when a confidence score, which is a result of the first utterance verification function, is accepted as a correct recognition, and transferring the speech recognition result to a system response module when a result of the second utterance verification function is accepted as the correct recognition.

4. The two stage utterance verification device of claim 3, wherein the heterogeneity feature data includes a SNR, an energy, a gender, an age, a phonetic structure, a dialect, the number of syllables in a word, the number of phonemes in a word, the number of frames in a word, a speaking rate, an average pitch, an utterance duration, a speech absent probability, a speech/non-speech likelihood, a Kalman shrinking factor, a Wiener shrinking factor, a N-best LLR score, an anti-model LLR score, a filter bank SNR, a LLR driven score, a SVM confidence score, a beam width during searching, a search time, a EPD time, a time for using system and a domain.

5. A method for two stage utterance verification method, comprising the steps of:
   a) performing a first utterance verification function based on a support vector machine (SVM) pattern classification method by using feature data inputted from a search block of a speech recognizer;
   b) determining whether a confidence score, which is a result value of the first utterance verification function, is a misrecognition level for deciding rejection of a speech recognition result;

c) performing a second utterance verification function based on a classification and regression tree (CART) pattern classification method by using heterogeneity feature data including meta data extracted from a preprocessing module, intermediate results from function blocks of the speech recognizer and the result of the first utterance verification function when the speech recognition result is accepted by the first utterance verification function, and returning when the speech recognition result is rejected by the first utterance verification function; and d) determining whether the speech recognition result is misrecognition based on a result of the second utterance verification function, transferring the speech recognition result to a system response module when the speech recognition result is accepted by the second utterance verification, and returning when the speech recognition result is rejected by the second utterance verification;

wherein the heterogeneity feature data of step c) includes a SNR, an energy, a gender, an age, a phonetic structure, a dialect, the number of syllables in a word, the number of phonemes in a word, the number of frames in a word, a speaking rate, an average pitch, an utterance duration, a speech absent probability, a speech/non-speech likelihood, a Kalman shrinking factor, a Wiener shrinking factor, a N-best LLR score, an anti-model LLR score, a filter bank SNR, a LLR driven score, a SVM confidence score, a beam width during searching, a search time, a EPD time, a time for using system and a domain.

6. A two stage utterance verification device in a speech recognition system, the device comprising:
   a speech input/output unit for inputting/outputting speech;
   a preprocessing module for receiving the speech from the speech input/output unit and extracting meta data from the received speech;
   a speech recognizer for performing speech recognition after receiving the meta data from the preprocessing module; and
   a utterance verification unit for performing a first utterance verification function based on feature data inputted from a search block of the speech recognizer by using a support vector machine (SVM) pattern classification method, performing a second utterance verification function based on a classification and regression tree (CART) pattern classification method by using heterogeneity feature data including the meta data extracted from the preprocessing module, intermediate result values from functional blocks of the speech recognizer and the result of the first utterance verification when a confidence score, which is a result of the first utterance verification function, is accepted as a correct recognition, and transferring the speech recognition result to a system response module when a result of the second utterance verification function is accepted as the correct recognition;
   wherein the heterogeneity feature data includes a SNR, an energy, a gender, an age, a phonetic structure, a dialect, the number of syllables in a word, the number of phonemes in a word, the number of frames in a word, a speaking rate, an average pitch, an utterance duration, a speech absent probability, a speech/non-speech likelihood, a Kalman shrinking factor, a Wiener shrinking factor, a N-best LLR score, an anti-model LLR score, a filter bank SNR, a LLR driven score, a SVM confidence score, a beam width during searching, a search time, a EPD time, a time for using system and a domain.

* * * * *